Feb. 23, 1965 A. FERRI 3,170,285
VERTICAL TAKEOFF AERIAL LIFTING DEVICE
Filed Jan. 2, 1958 4 Sheets-Sheet 1

INVENTOR
ANTONIO FERRI
BY
ATTORNEYS

Feb. 23, 1965  A. FERRI  3,170,285
VERTICAL TAKEOFF AERIAL LIFTING DEVICE
Filed Jan. 2, 1958  4 Sheets-Sheet 2
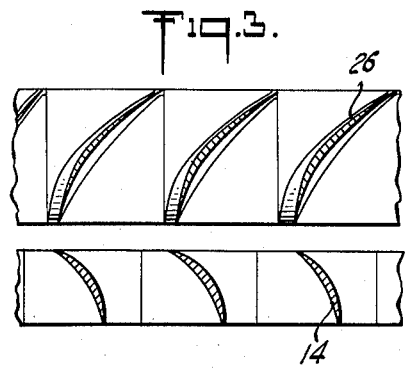
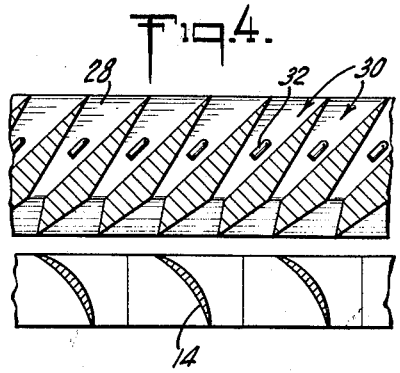
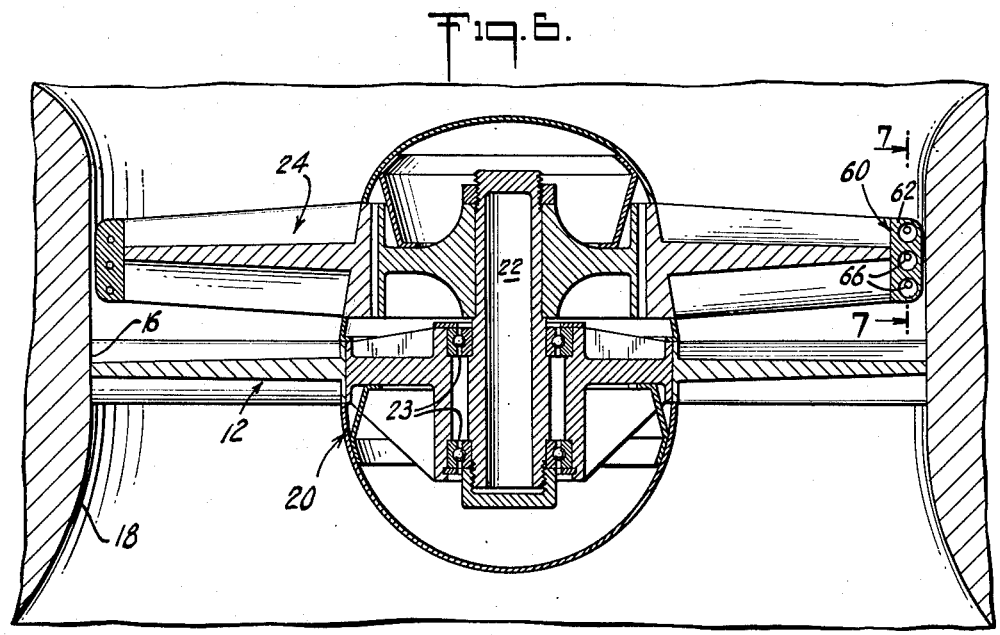
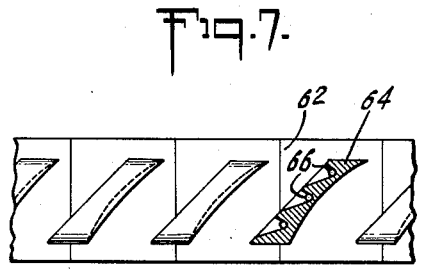
INVENTOR
ANTONIO FERRI

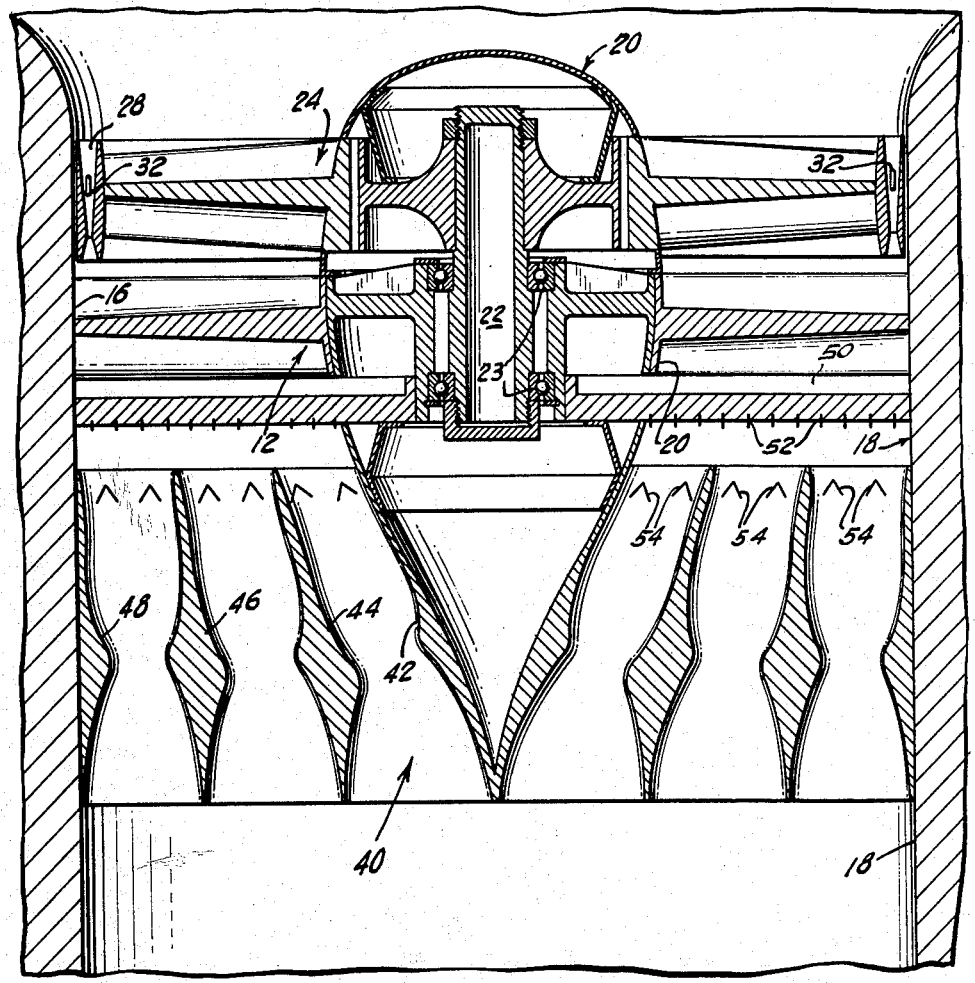

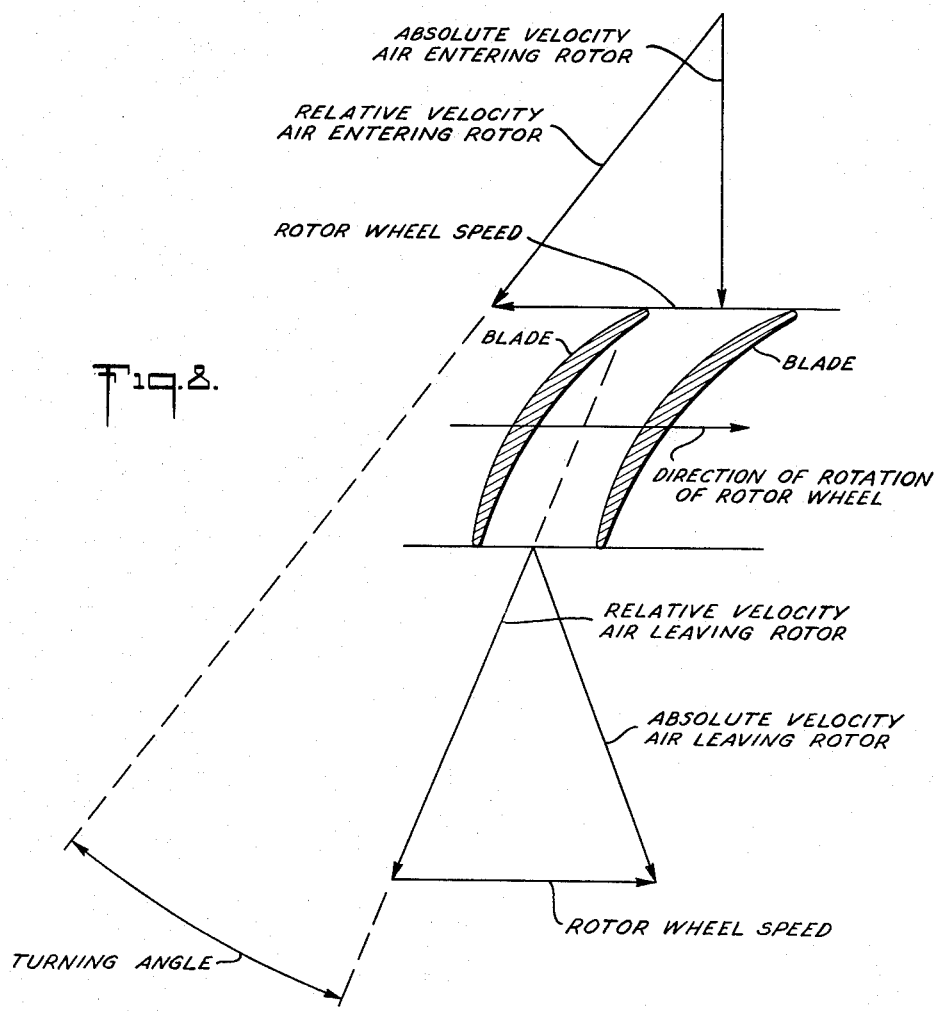

United States Patent Office 3,170,285
Patented Feb. 23, 1965

3,170,285
VERTICAL TAKEOFF AERIAL LIFTING DEVICE
Antonio Ferri, Rockville Centre, N.Y., assignor to Gruen Applied Science Laboratories, Inc., Hempstead, N.Y., a corporation of New York
Filed Jan. 2, 1958, Ser. No. 706,639
4 Claims. (Cl. 60—35.6)

This invention relates to an improved self-lifting device for vertically lifting and transporting heavy objects such as cargo or passengers.

An object of this invention is to provide for use with small, vertical takeoff aircraft and the like, a propulsion unit having a very high ratio of lifting force to weight and having good fuel efficiency.

Another object is to provide a unit of this kind which is also relatively simple in construction and low in cost both of manufacture and of operation.

Still another object is to provide such a unit which can be made small in size so that it can be incorporated or built into aircraft no larger than an automobile, for example.

These and other objects will in part be understood from and in part pointed out in the description given hereinafter.

The increasing industrialization throughout the nation and the crowding of cities has increased the interest for an aircraft which can take off into the air or land vertically without requiring a space-consuming runway. Aerial jeeps or vehicles of one kind or another are presently under development by many different companies but the fact that so many different types are being designed is a good indication that no one type is completely satisfactory.

Perhaps the most widely known kind of vertical takeoff aircraft at present is the helicopter. Such an aircraft obtains its lift from a large, windmill-like propeller mounted horizontally above the fuselage and rotated at subsonic velocity. Though widely used for many specialized purposes, helicopters still have a number of restrictive shortcomings which to now at least have prevented their even wider use. Among these shortcomings is the relatively large size of the propeller required to lift a given weight load, as well as the complex cycling mechanism at the hub of the propeller. This in turn adds to the dead weight which must be carried along with useful load. Moreover, in addition to the usual aerodynamic limitations of airplane propellers, a helicopter propeller is very large and rotates with a considerable amount of momentum, consequently it has an extraordinary influence on the stability and control characteristics of the plane making it difficult and sometimes dangerous to fly. The present invention seeks to provide an improved propulsion device for a vertical takeoff aircraft which is very much smaller in size than the propeller of a helicopter but which is able to lift a heavy load with good fuel efficiency.

In accordance with one specific embodiment of the present invention, there is provided an air compressing unit which draws air in at high subsonic velocity and exhausts it backward at higher velocity to obtain a very large propulsive force per unit of area. The rotating member of the compressor is in the form of a compressor rotor which is self-powered by means of small ram-jet nozzles spaced around its rim. These nozzles not only power the compressor but also provide some lift of their own thereby further increasing overall lift. The compressor is rotated so that the relative airspeeds over the blades are supersonic. Immediately behind the compressor rotor there is placed a stator which not only mechanically supports the compressor but also removes the rotational component of velocity of the air expelled by it. The twist or turning angle of these blades and their velocity are such that during normal operation there is no appreciable rise in static pressure through the unit.

A better understanding of the invention together with a fuller appreciation of its many advantages will best be gained from a study of the following description given in connection with the accompanying drawings wherein:

FIGURE 3 is a cross-sectional view of a portion of rotor and stator of the unit taken along the arcuate lines 3—3 in FIGURE 1;

FIGURE 4 is a cross-sectional view of a portion of the ram-jet nozzles of the unit taken as indicated by the arcuate lines 4—4 in FIGURE 1;

FIGURE 5 is a cross-sectional view of a unit identical to that seen in FIGURES 1 and 2 but having an afterburner for increased thrust;

FIGURE 6 is a cross-sectional view of still another unit whose rotor is driven by rockets placed along its rim;

FIGURE 7 is a detail view of the rocket nozzles of the unit in FIGURE 6;

FIGURE 8 is a sketch showing the various velocity vectors of the rotor and air stream and illustrating the turning angle of the air stream passing through the rotor.

Figure 1:
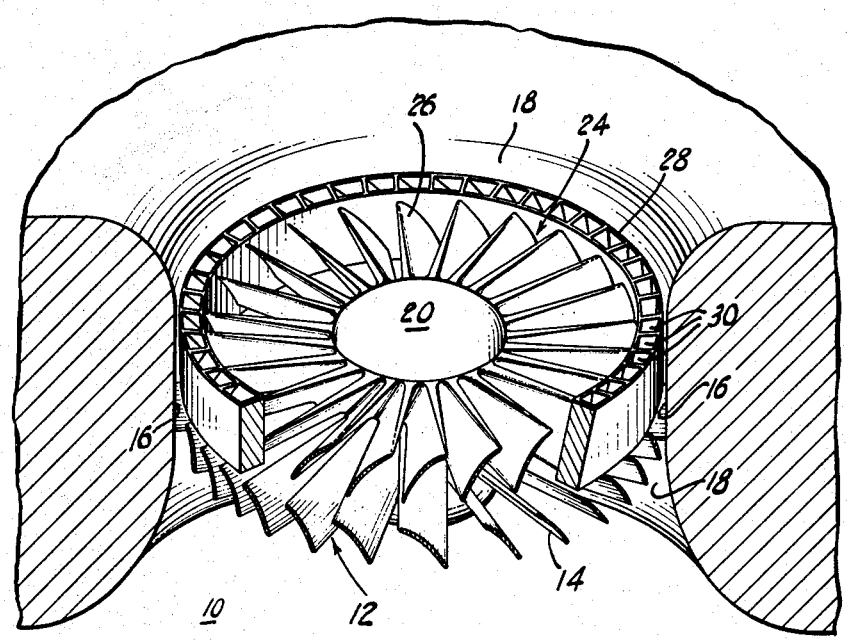
FIGURE 1 is a perspective view, partly broken away of a propulsion unit incorporating features of the invention and shown mounted in a wing panel.
Figure 2:
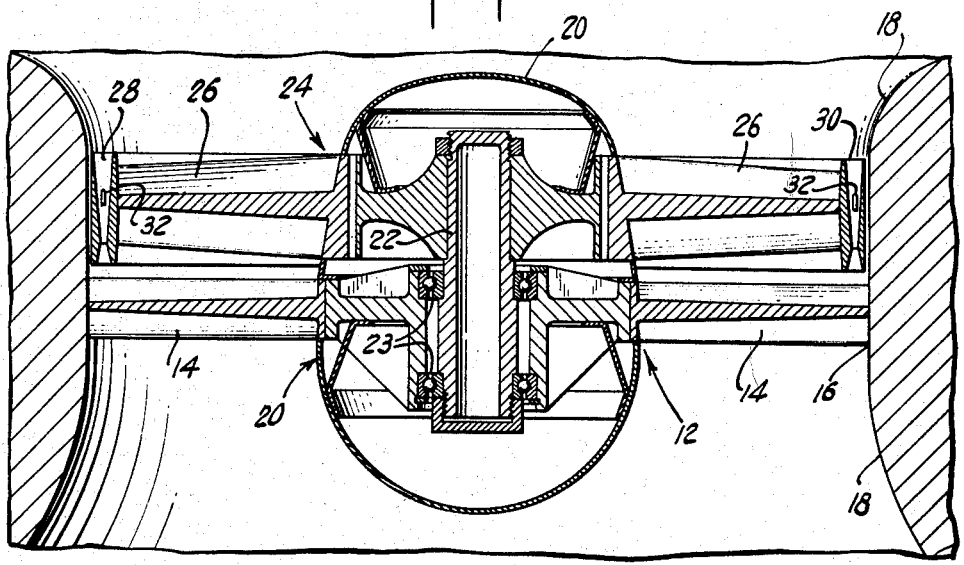
FIGURE 2 is a cross-sectional view of the unit seen in FIGURE 1.

The unit 10 seen in FIGURE 1 comprises a stator 12 having blades 14, the tips of these blades being rigidly joined at 16 to the cylindrical wall 18 which defines an axial opening through a wing panel or body portion of a fuselage (not generally shown). The inner ends of the stator blades, see also FIGURE 2, support a hub 20 within which is rotatably journaled the shaft 22. The lower part of the hub is stationary and carries the bearings 23 which support shaft 22. The upper end of this shaft carries a rotor 24 having blades 26, the outer ends of these blades in turn supporting the nozzle ring 28 by means of which the rotor is driven. The relative shapes and positions of stator and rotor blades is shown in FIGURE 3. The turning angle of the rotor blades, that is the degree of twist which turns the airflow, is of the order of 20 degrees in the specific unit described herein the various velocity vectors of the rotor, the entering and leaving air streams, and the "turning angle" of the air stream are illustrated in FIGURE 8.

Closely spaced within nozzle ring 28 are a multiplicity of ram-jet nozzles 30 whose mouths as seen in FIGURES 1 and 4 are inclined forward in the direction of rotation of rotor 24. Air scooped or sucked into the nozzles when the rotor rotates is combined with fuel sprayed into the nozzles from the orifices 32 midway along each nozzle. Fuel is supplied to the nozzles along hollow passages (not shown) in certain of the rotor blades, these passages being connected to corresponding ones in the stator blades via the hollow central opening in shaft 22. The resulting gases of combustion from the burning fuel are exhausted from the nozzles with both tangential and straight rearward components of velocity, thereby providing the force necessary to rotate rotor 24 at high velocity and also providing additional lifting thrust. The ram-jet operation of these nozzles will be understood by those skilled in the art.

The unit 10 seen in FIGURES 1 through 4 has, by way of example, a blade tip diameter of 6 feet and a hub diameter of 2.4 feet. The rotor tip speed is 1,300 ft./sec., corresponding to a rotational velocity for rotor 24 of 4150 r.p.m. Assuming an entering axial air velocity of Mach 1 at the R.M.S. diameter of 4.57 feet, and for air flow turned 20° in the rotor with a rotor pressure recovery of 0.95 and no change in static pressure, the stagnation pressure ratio across the unit is 1.47. The unit has a lift or thrust force of somewhat over 30,000 pounds. The tangential force required at the tips of the blades of rotor 24 to produce this amount of lift is about 12,000 pounds. Taking into account the added lift provided by the axial component of nozzle exhaust, the specific fuel consumption per hour of type JP–4 fuel for each pound of lift at 30,000 lbs. total is between 0.6 and 0.77 pound/hr. This fuel consumption, it will be appreciated, is much below corresponding values for turbojet engines, for example, and so it is apparent that for a relatively small unit a very sizeable lift with excellent fuel efficiency is obtained by virtue of the invention.

To augment the thrust of unit 10, it can be provided with an after-burner. Such an arrangement is shown in FIGURE 5 wherein the elements of unit 10 are combined with an after-burner, generally indicated at 40, positioned behind stator 12 and supported from the cylindrical wall 18. Here, the lower end of hub 20 is tapered along the surface 42 toward a point and provides in conjunction with the nozzle rings 44, 46 and 48 three concentric contoured annular passages through which flows the air exhausted from the compressor unit above it. Positioned in the plane between the blades of stator 12 and the upper edges of rings 44, 46 and 48 is a fuel nozzle assembly having a number of radial spokes 50 extending from hub 20 to wall 18. Each spoke has a number of fuel spraying orifices 52 spaced along it and pointed down toward the after-burner. Immediately below these nozzles and just within the mouths of rings 44, 46 and 48 are a number of flame holders or fuel igniters 54 which initiate burning of the fuel being sprayed into the after-burner. The resulting increase in the velocity of the air passing from the compressor of the unit into the after-burner considerably increases total thrust.

A slightly modified form of lifting unit is shown in FIGURE 6 wherein the ram-jet nozzle ring 28 of the rotor of unit 10 in FIGURE 1 has been replaced by a jet nozzle assembly 60. This includes a circular ring 62 supported on the ends of the rotor blades and having spaced along it as seen in FIGURE 7 a number of curved vanes 64. Each of these vanes has, for example, three nozzles 66, each of which is pointed downward and opposite to the direction of rotation of the rotor. Each nozzle is adapted to spray a stream of jet fuel into the combustion region formed immediately at the mouth of the nozzle and between each two adjacent vanes. The operation of the unit shown in FIGURES 6 and 7 is otherwise substantially identical to that of the unit shown in FIGURE 1.

The above description of the invention is intended in illustration and not in limitation of it. Various changes or modifications of the embodiments described may occur to those skilled in the art and these can be made without departing from the spirit or scope of the invention as set forth.

I claim:

1. A vertical lifting device including a stator having blades whose outer tips are supported against a cylindrical wall defining an axial opening and whose inner tips support a hub centrally positioned within said opening, a rotor rotatably mounted on said hub and having compressor blades closely above said stator, said blades being closely positioned to each other and extending for a major portion of said opening, a nozzle assembly mounted closely adjacent said wall on the outer tips of said rotor blades to exhaust gases at high velocity and propel the tips of said rotor at supersonic velocity, the turning angle of said rotor and its velocity being such that there is no appreciable rise in static pressure through said device.

2. The structure as in claim 1 wherein the turning angle of the rotor blades is of the order of 20°.

3. A method of operating a bladed compressor wheel of the character described to obtain great lifting force and improved fuel efficiency from a wheel having a relatively small diameter, said method comprising taking a compressor wheel mounted in the body panel of an aircraft and the like, driving said wheel with a supersonic tip velocity to draw air into said wheel at an average velocity of Mach 1, and exhausting the the air therefrom at substantially higher velocity with no appreciable rise in static pressure.

4. A vertical lifting device including a stator having blades whose outer tips are supported against a cylindrical wall defining an axial opening and whose inner tips support a hub centrally positioned within said opening, a rotor rotatably mounted on said hub and having closely spaced compressor blades closely above said stator, said blades extending radially for a major portion of said opening, drive means to propel the tips of said rotor at supersonic velocity, the turning angle of said blades and their velocity being such that there is no substantial rise in static pressure through said device, the average air velocity through said rotor being substantially Mach 1.

References Cited in the file of this patent

UNITED STATES PATENTS

| | | |
|---|---|---|
| 2,425,904 | Vernon | Aug. 19, 1947 |
| 2,498,939 | Bobier | Feb. 28, 1950 |
| 2,623,688 | Davidson | Dec. 30, 1952 |
| 2,690,809 | Kerry | Oct. 5, 1954 |
| 2,782,861 | Lent | Feb. 26, 1957 |
| 2,844,001 | Alford | July 22, 1958 |
| 2,884,633 | Stahmer | Apr. 28, 1959 |
| 2,940,689 | Howell | June 14, 1960 |

FOREIGN PATENTS

| | | |
|---|---|---|
| 475,836 | Canada | Aug. 7, 1951 |
| 1,068,404 | France | Feb. 3, 1954 |

OTHER REFERENCES

Principles of Jet Propulsion and Gas Turbines, M. J. Zucrow; published by John Wiley and Sons, Inc., New York (see pages 387–397 concerning "The Axial Flow Compressor").

Marks' Mechanical Engineers' Handbook, 6th Edition, edited by Theodore Baumeister; published by McGraw-Hill Book Co., New York (see pages 14–75 to 14–79 concerning "Design of Axial Fans").